Feb. 14, 1928.
O. E. SCHAUER ET AL
1,659,304
SPLIT SLEEVE FRICTIONAL REVERSER
Filed Dec. 3, 1925    2 Sheets-Sheet 2
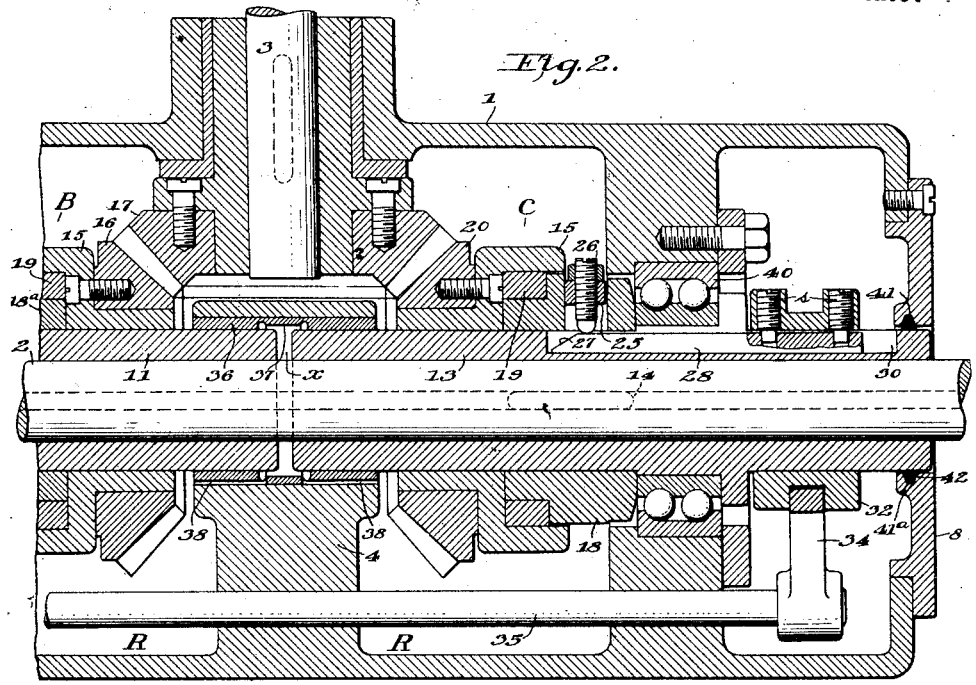
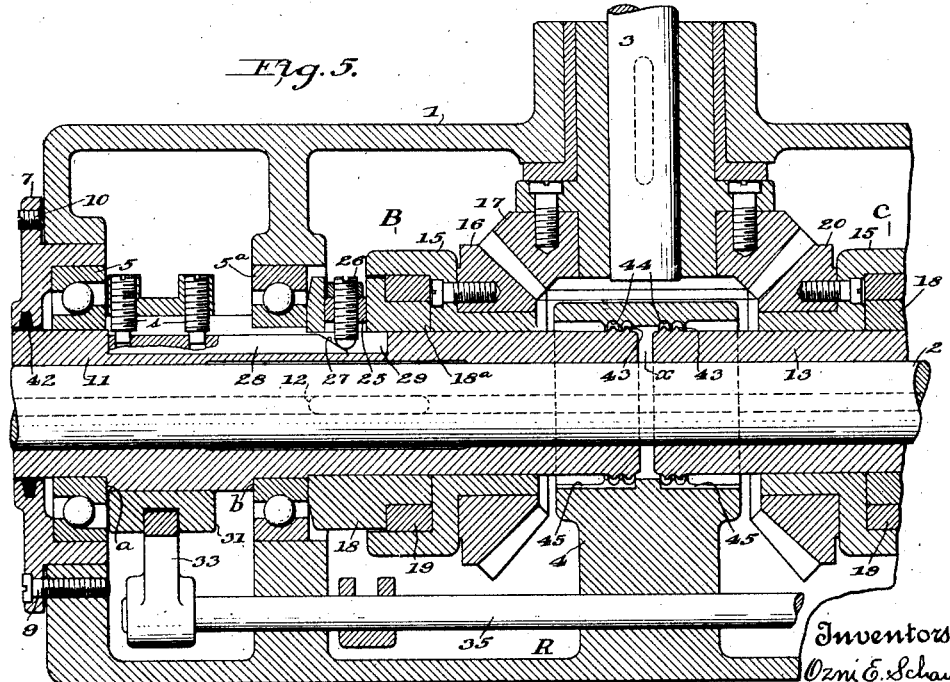
Inventors
Ozni E. Schauer
Rowland L. Rickwood
By Attorney
Albert F. Nathan Patented Feb. 14, 1928.

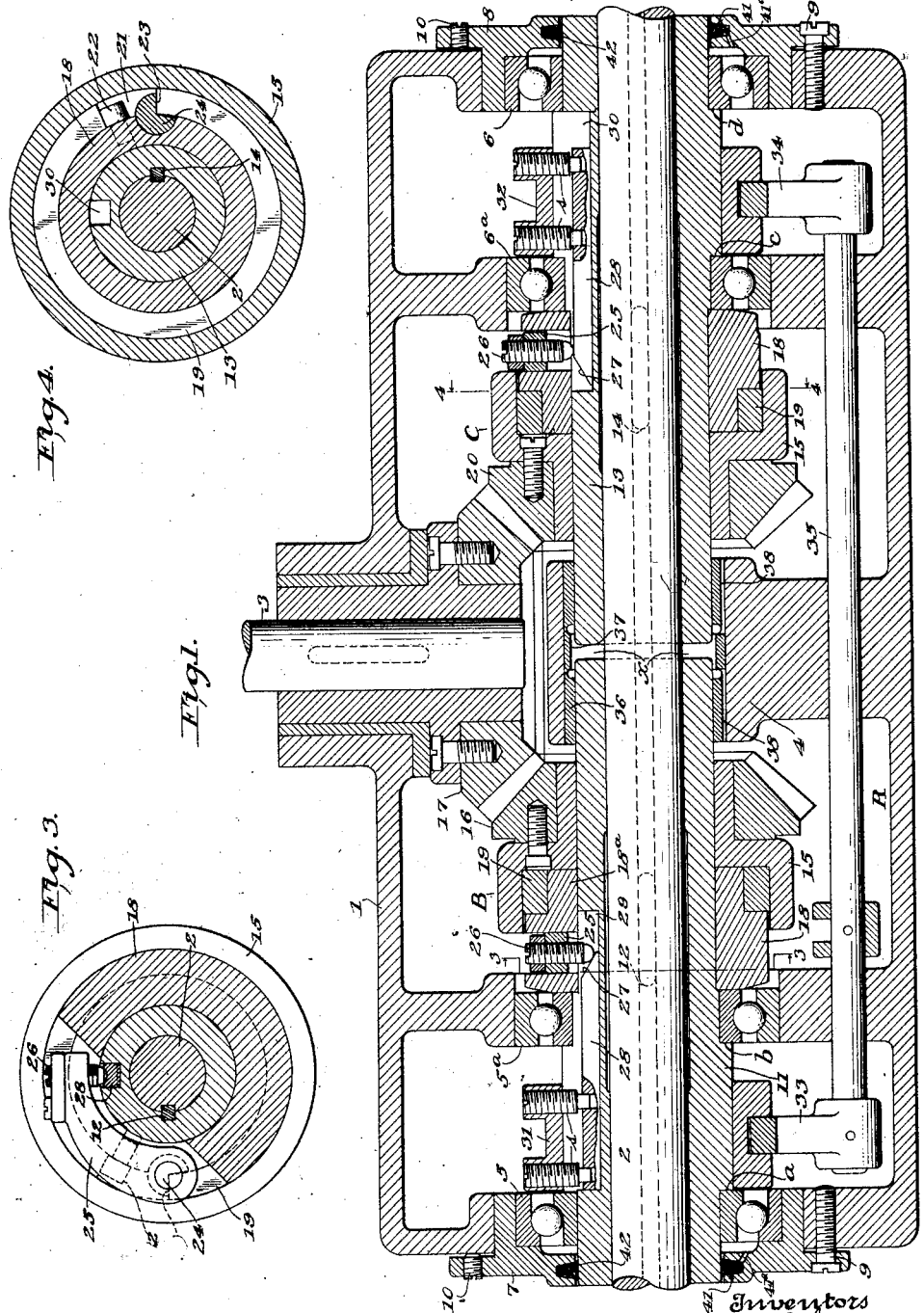

1,659,304

UNITED STATES PATENT OFFICE.

OZNI E. SCHAUER AND ROWLAND L. RICKWOOD, OF CINCINNATI, OHIO, ASSIGNORS TO THE CINCINNATI BICKFORD TOOL COMPANY, OF CINCINNATI, OHIO, A CORPORATION OF OHIO.

SPLIT-SLEEVE FRICTIONAL REVERSER.

Application filed December 3, 1925. Serial No. 72,940.

This invention relates to motion reversers of the friction type and it proposes an improved construction particularly adapted for embodiment in drilling machines as a so-called "tapping" instrumentality.

These devices commonly comprise a drive shaft, two bevel gears loosely journaled coaxial with the drive shaft, a power-delivery shaft arranged at right angles to the drive shaft and carrying a bevel-gear having its opposite sides permanently in mesh with the two driving gears, and friction clutches selectively actuated to secure either of the driving gears to the drive shaft, whereby the gear on the power-delivery shaft selectively may be driven in reverse directions. To permit of bodily movement of the drillhead on the arm it is necessary that the drive-gears be bodily movable lengthwise of the drive shaft.

To the end that frictional reversers of this type may operate freely without binding and without excessive wear on the parts, certain structural characteristics are essential. Among these may be noted (1) the drive-gears must be rotatable with the drive shaft but freely translatable relative thereto, (2) the gears, bearings, clutches, etc., must be kept generously lubricated, (3) the lubricant must be prevented from escaping from the parts to be lubricated.

This invention has for an object to provide an improved frictional reverser rigid in construction and which will maintain the parts in true alignment and which admits of being readily made and assembled.

Another object of the invention is so to construct the reverser that good lubrication will be attained and which will, likewise, prevent escape of the lubricant.

These objects have been attained by embodying in a frictional reverser two relatively short sleeves, splined to the drive shaft, each carrying one of the drive gears and its associated clutch, instead of a single long sleeve carrying both gears. An improved arrangement of bearings back of each driving gear (and also between the driving gears) gives each of the sleeves ample support to prevent deflection of the sleeve by the driving strains, thus the sleeves are maintained freely translatable on the drive shaft. The two sleeves are spaced apart endwise within the center bearing and this space is surrounded by an annular groove in the bearing which receives the oil passing through the bearing and thrown off the sleeves by centrifugal force. This space between the ends of the sleeves also permits each of the sleeves to be adjusted lengthwise independently of the other for purposes later to be explained. An oil duct connects with the annular groove and serves to lead the oil back to the reservoir thereby preventing it from flowing outwardly along the keyway in the shaft. The two sleeves, each being only about one-half as long as the single sleeves heretofore used, are much more easily and accurately manufactured and are consequently less costly, therefore, by means of the present invention, a better product is available at a substantially reduced cost.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a longitudinal section of a frictional motion reverser embodying the present invention. Fig. 2 is a view similar to one-half of Fig. 1 but showing a modified arrangement of bearings for the driving sleeves. Figs. 3 and 4 are sections on the lines 3—3 and 4—4 respectively of Fig. 1. Fig. 5 is a longitudinal section showing a modified oil collecting means to prevent excess quantities of oil from flowing through the key-way in the drive shaft.

Referring more particularly to the drawings and especially to Fig. 1, the invention is disclosed as embodied in a motion reverser comprising a casing 1 for supporting and positioning the major elements of the device. Transversely arranged driving and driven shafts are rotatably journaled in the casing and the improved motion reverser acts selectively to rotate the driven shaft from the driving shaft in reverse directions. Either of the shafts may act as the driver and either may be the driven shaft but, for convenience of description, let it be considered that power enters the device through shaft 2 and flows outwardly therefrom through shaft 3. The casing 1 is formed with a central bearing boss 4 preferably in alignment with the power delivery shaft 3. At either side of the central bearing the casing supports antifriction bearings 5, 5ᵃ, and 6, 6ᵃ respectively. The bearings 5 and 6 are mounted in caps or plates 7 and 8 respectively which telescope into appropriate openings in the opposite end walls of the casing 1. These caps may be adjusted axially by draw bolts 9 and limit screws 10 for a purpose later to be explained. Within the bearings 4, 5 and 5ᵃ is rotatably journaled a sleeve 11 having a splined connection 12 with a shaft 2. A like sleeve 13 is journaled in the bearings 4, 6 and 6ᵃ and is splined to the shaft 2 at 14. Loosely journaled on the sleeve 11 is a clutch casing 15 (forming a part of a clutch B) carrying a bevel gear 16 maintained permanently in mesh with a similar gear 17 secured on the power-delivery shaft 3. A clutch block 18 secured to the sleeve 11 has a portion 18ᵃ extending into the clutch casing and an expansible ring 19 serves, at certain times, to lock the parts 18ᵃ and 15 together to cause power to be transmitted from the shaft 2, through the sleeve 11, clutch 18—19—15 and gears 16 and 17 to rotate the shaft 3 in one direction. A similar clutch, designated generally as C, carries a bevel gear 20 permanently in mesh with the gear 17 diametrically opposite the gear 16. When the clutch C is rendered effective, power flows from the shaft 2 through clutch C and gear 20 to the gear 17 to rotate the shaft 3 in a direction opposite to that caused by the action of the gear 16.

The clutches B and C are of the type shown in United States patent to Schauer No. 756,185 and each comprise a casing 15, driving block 18, and an expansible ring 19. As shown in Figs. 3 and 4, the ring 19 is split at 21 and has one end seated against an abutment 22 fixed to the block 18. The other end of the ring engages a cam wall 23 provided by a short rock-shaft 24 journaled in the block 18 and, therefore, as the shaft 24 is rotated in one direction the wall 23 causes the ring 19 to be expanded to lock together the parts 18ᵃ and 15. A rock-arm 25, fixed to the shaft 24, carries an adjustable contact screw 26 engaging the beveled end 27 of a slide-bar 28 whereby movement of the slide-bar causes a turning motion to be transmitted to the shaft 24 through the arm 25. The slide bars 28 of the clutches B and C are slidingly mounted in ways 29 and 30 in the sleeves 11 and 13 respectively. Collars 31 and 32, translatably mounted on the sleeves 11 and 13, are attached to the slide-bars 28 by screws $s$ and are engaged by shifting forks 33 and 34, respectively, secured to a rod 35 slidably mounted in the casing 1. Any suitable means may be provided to shift the rod 35 axially selectively to actuate the clutches B and C. One suitable means that might be utilized to shift the slide rod is shown in United States patent to Klausmeyer, Number 1,505,074.

It is to be observed that each sleeve is journaled in three spaced bearings; one at each end and one substantially midway between its ends. By means of this construction a very rigid reverser is secured and one that will not bind under working pressures.

Adjacent the collars 31 and 32, the sleeves 11 and 13 are of enlarged diameter; thereby providing shoulders $a$, $b$ and $c$, $d$ adapted to engage the inner rings of the bearings 5, 5ᵃ and 6, 6ᵃ respectively. Thus by shifting the caps 7 and 8 inwardly, by the draw bolts 9, the sleeves 11 and 13 and the parts carried thereby may be adjusted toward the axis of the shaft to compensate for wear in the bearings and on the gears 16, 17 and 20. The adjacent ends of the sleeves 11 and 13 are fitted within a bushing 36 supported by the bearing 4 and these sleeves are spaced apart as indicated by $x$. The bushing 36 is formed on its inner surface with an annular groove 37 which surrounds the inner ends of the sleeves and acts to receive lubricant thrown off by centrifugal force by the rotation of the sleeves. Discharge ducts 38 in the lower part of the bushing connect with the annular groove 37 and serve to drain the lubricant back into the reservoir R provided by the casing. By means of this construction the lubricant which is picked up by the gears and finally finds its way into the bearing 4 is prevented from flowing outwardly through the key-way in the drive-shaft while still permitting sufficient oil to come into contact with the shaft to adequately lubricate the contact surfaces between the shaft and the sleeves 11 and 13.

Under certain conditions, it may be advisable to provide the reverser with the modified arrangement of sleeve bearings as shown in Fig. 2. In this form, each sleeve is supported by only two bearings; viz, the central bearing 4 and a single bearing 40 sustained by the casing at the opposite side of the clutch. It will readily be perceived that this is a simpler construction than that shown in Fig. 1, that it is less costly to build, and that it is easier to assemble.

A further modification is shown in Fig. 5 in which the sleeve is shown as supported wholly behind the friction clutch; the member 4 being utilized as an oil collector only and not as a bearing for the sleeves. In this form, the sleeves are preferably formed adjacent their inner ends with a plurality of oil-deflecting rings or flanges 43 which cooperate with annular grooves 44 in the housing to throw the oil from the sleeves and thereby prevent large quantities of oil from reaching the drive shaft. A duct 45 leads the oil from the grooves 44 back into the reservoir.

To prevent escape of lubricant from the casings 1 each of the end caps 7 and 8 may be formed with an annular groove 41 within which is fitted a packing ring 42 which wipes upon the outer periphery of the sleeves 11 and 13. These packing rings also serve to prevent the entrance of dust etc. to the casing. Ducts 41ª lead from the groove 41 back into the casing to return thereto the lubricant picked up by the packing rings.

From the foregoing, it will be perceived that there has been provided an improved frictional motion reverser in which each driving gear is supported upon an individual sleeve which is more rigidly supported than the single sleeve in prior devices, thereby preventing binding between the sleeve and the drive shaft. Also that the parts are easier and less costly to manufacture and that the improved device affords better lubrication of the parts without permitting escape of the lubricant.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:—

1. A motion reverser combining a casing; a first shaft extending through said casing; a second shaft journaled in said casing transversely to said first shaft; a gear on said second shaft; two gears rotatably journaled co-axial with said first shaft and meshing with the first named gear; a sleeve intermediate each of said two gears and said shaft, each of said sleeves supporting one of said gears and having a splined connection with said shaft; bearings for rotatably supporting said sleeves; means for selectively engaging each of said two gears with its supporting sleeve; and means for axially adjusting one of said sleeves in said casing.

2. A motion reverser combining a casing; a first shaft extending through said casing; a second shaft journaled in said casing transversely to said first shaft; a gear on said second shaft; two gears rotatably journaled co-axial with said first shaft and meshing with the first named gear; two sleeves splined to said first shaft; clutch mechanism between each of said two gears and one of said sleeves for causing said gears to rotate with said sleeves; a bearing intermediate said two gears for the adjacent ends of said sleeves; and independent bearings back of said two gears for the opposite ends of said sleeves.

3. A motion reverser combining a casing; a first shaft extending through said casing; a second shaft journaled in said casing transversely to said first shaft; a gear on said second shaft; two sleeves splined to said first shaft; a gear rotatably journaled on each of said sleeves and meshing with the gear on the second shaft; bearings for each of said sleeves supported by said casing at opposite sides of the gear thereon; and means selectively to effect a driving connection between said sleeves and their associated gears.

4. A motion reverser combining a casing; a drive shaft extending therethrough; a driven shaft; a bevel-gear on said driven shaft; two aligned sleeves having a splined connection with said drive-shaft; a bevel gear rotatably journaled on each of said sleeves and meshing with the first named bevel gear at opposite sides thereof; a friction clutch associated with each of said sleeves and each adapted to secure one of said bevel gears to one of said sleeves; means selectively to actuate said clutches to cause said driven shaft to be rotated in reverse directions; and individual means to shift each of said sleeves and its associated gear axially in said casing to compensate for wear in said bevel gears.

5. A friction reverser combining an elongated closed casing; a drive shaft extending therethrough; a driven shaft; two spaced sleeves rotatably journaled in bearings supported by said casing and each having a splined connection with said drive shaft; a reversing mechanism within said casing comprehending a driving bevel gear rotatably but non-translatably journaled on each of said sleeves; an intermediate bevel gear on said driven shaft; a clutch associated with each of said driving bevel gears to secure it to its supporting sleeve; and individual means adjustable from without the casing for shifting each of said sleeves axially to compensate for wear in said bearings and gears.

6. A motion reverser combining a casing; a first shaft extending therethrough; a second shaft journaled in said casing transversely to said first shaft; a bevel gear on said second shaft; two sleeves splined to said first shaft; a driving bevel gear rotatably journaled on each of said sleeves and meshing with the first-named gear; three bearings for each of said sleeves, one of said bearings being located adjacent one end of said sleeves at the face-side of each of said driving bevel-gears, one at the opposite ends of said sleeves and one substantially midway between the ends of said sleeves, the last mentioned two bearings being located behind said driving gears; and means for selectively clutching said driving bevel gears each to its individual driving sleeve.

7. A motion reverser combining a closed casing providing an oil reservoir; a first shaft extending through said casing; a second shaft journaled transversely to said first shaft; a gear on said second shaft; a central bearing sustained by said casing substantially in line with said second shaft; two aligned sleeves rotatably journaled in said casing and each having a translatable but non-rotatable connection with said first shaft, the adjacent ends of said sleeves being journaled in said central bearing; an annular chamber within said central bearing and surrounding the adjacent ends of said sleeves and adapted to receive oil thrown off by said sleeves; a drain to return the oil from said chamber to the reservoir; a gear on each of said sleeves meshing with the first named gear; and means selectively to clutch each of said sleeves to the gear thereon.

8. A motion reverser combining a closed casing providing an oil reservoir; a shaft extending through said casing; a second shaft journaled transversely to said first shaft; two aligned sleeves rotatably journaled in said casing with their adjacent ends spaced apart and having translatable but non-rotatable connections with said first shaft; a bevel gear rotatably journaled on each of said sleeves and permanently meshing with a gear on said second shaft; a bearing member supported by said casing in the region of the adjacent ends of said sleeves; a bearing bushing within said member and affording a bearing for said sleeves, said bushing being provided with an oil collecting chamber adapted to receive oil passing through said sleeve bearings; a drain to return the oil from said chamber to the reservoir; and means selectively to clutch said sleeves to the gear thereon.

9. A motion reverser combining a closed casing providing an oil reservoir; two aligned sleeves independently journaled in said casing; a rotating shaft extending through said sleeves and having a splined connection with said sleeves; a gear rotatably journaled on each of said sleeves and arranged to pick up oil from said reservoir; an oil collector surrounding said shaft and the adjacent ends of said sleeves and providing a drain leading back to said reservoir, said oil collector and drain being adapted to prevent a substantial quantity of oil from entering the spline in said shaft; a second shaft; reversely acting gear connections between said second shaft and the gears on said sleeves; and means to clutch said sleeves to the gears thereon selectively to rotate the second shaft in reverse directions.

10. A motion reverser combining a casing; a driving shaft; a driven shaft; two sleeves rotatably journaled in said casing and each having a splined connection with said driving shaft; a bevel gear on said driven shaft; a bevel gear rotatably journaled on each of said sleeves and meshing with opposite sides of the first named gear; a friction clutch device for locking each of said sleeves to the gear journaled thereon; a clutch actuating bar slidingly fitted within a slideway in each of said sleeves; and means to shift said slide bars simultaneously to cause one of said clutches to be rendered effective to transmit motion and the other to be rendered ineffective.

11. In a motion reverser having a closed casing providing an oil reservoir therefor, a shaft rotatably mounted in said casing; a second shaft rotatably mounted in said casing; a pair of sleeves journaled in said casing and splined on said first named shaft to rotate therewith, the adjacent ends of said sleeves being axially spaced; means for operatively connecting said second shaft to either of said sleeves and adapted to be lubricated by the oil in said reservoir; and an oil collector surrounding said adjacent ends and space whereby an excessive amount of oil is prevented from flowing out the splines in said shaft.

In witness whereof, we have hereunto subscribed our names.

OZNI E. SCHAUER.
ROWLAND L. RICKWOOD.